(12) United States Patent
Katsuta et al.

(10) Patent No.: US 11,572,316 B2
(45) Date of Patent: Feb. 7, 2023

(54) METHOD FOR MOLDING CERAMIC MATERIAL, METHOD FOR PRODUCING CERAMIC ARTICLE, AND CERAMIC ARTICLE

(71) Applicant: AGC INC., Chiyoda-ku (JP)

(72) Inventors: Makoto Katsuta, Tokyo (JP); Misako Kijima, Tokyo (JP); Yasuo Shinozaki, Tokyo (JP)

(73) Assignee: AGC INC., Chiyoda-ku (JP)

( * ) Notice: Subject to any disclaimer, the term of this patent is extended or adjusted under 35 U.S.C. 154(b) by 1023 days.

(21) Appl. No.: 16/281,389

(22) Filed: Feb. 21, 2019

(65) Prior Publication Data

US 2019/0185380 A1 Jun. 20, 2019

Related U.S. Application Data

(63) Continuation of application No. PCT/JP2017/029721, filed on Aug. 21, 2017.

(30) Foreign Application Priority Data

Aug. 24, 2016 (JP) .............................. JP2016-163805

(51) Int. Cl.
*B28B 1/24* (2006.01)
*C04B 35/626* (2006.01)
(Continued)

(52) U.S. Cl.
CPC .............. *C04B 35/481* (2013.01); *B28B 1/24* (2013.01); *C04B 35/571* (2013.01); *C04B 35/575* (2013.01); *C04B 35/622* (2013.01); *C04B 35/6269* (2013.01); *C04B 35/62655* (2013.01); *C04B 35/62665* (2013.01); *C04B 35/6455* (2013.01); *C04B 2235/3878* (2013.01); *C04B 2235/6022* (2013.01)

(58) Field of Classification Search
CPC ...................... C04B 35/6269; C04B 35/62685
See application file for complete search history.

(56) References Cited

U.S. PATENT DOCUMENTS 4,432,798 A * 2/1984 Helferich ................ C04B 28/00
106/632
5,772,946 A 6/1998 Kaminaga et al.

FOREIGN PATENT DOCUMENTS

JP 1-204702 A 8/1989
JP 4-224511 8/1992
(Continued)

OTHER PUBLICATIONS

Lu Yan-ping, "Cold Isostatic Pressing Technology of Ceramics", Vacuum Electronics, Aug. 31, 2011, pp. 31-34 (with English abstract).
(Continued)

*Primary Examiner* — Erin Snelting
(74) *Attorney, Agent, or Firm* — Oblon, McClelland, Maier & Neustadt, L.L.P.

(57) ABSTRACT

A method for molding a ceramic material includes: mixing a ceramic powder, a resin, a curing agent and a solvent to obtain a raw material slurry for a ceramic material; injecting the raw material slurry into an elastic container; curing the resin in the raw material slurry injected into the elastic container to form a molded body having a desired shape; and demolding the molded body from the elastic container.

14 Claims, 2 Drawing Sheets

(51) Int. Cl.
*C04B 35/584* (2006.01)
*C04B 35/48* (2006.01)
*C04B 35/622* (2006.01)
*C04B 35/645* (2006.01)
*C04B 35/571* (2006.01)
*C04B 35/575* (2006.01)

(56) References Cited

FOREIGN PATENT DOCUMENTS

| | | |
|---|---|---|
| JP | 7-171846 | 7/1995 |
| JP | 2000-290075 A | 10/2000 |
| JP | 2001-278673 A | 10/2001 |
| JP | 2007-136912 | 6/2007 |
| JP | 2007-261925 | 10/2007 |
| JP | 2009-234852 | 10/2009 |
| JP | 2011-157222 | 8/2011 |
| JP | 2011157222 A * | 8/2011 |
| WO | WO2013/035302 A1 | 3/2013 |

OTHER PUBLICATIONS

Extended European Search Report dated Mar. 3, 2020, in Patent Application No. 17843511.1, 7 pages.
International Search Report dated Nov. 21, 2017 in PCT/JP2017/029721 filed Aug. 21, 2017 (with English Translation).
Written Opinion dated Nov. 21, 2017 in PCT/JP2017/029721 filed Aug. 21, 2017.

* cited by examiner

METHOD FOR MOLDING CERAMIC MATERIAL, METHOD FOR PRODUCING CERAMIC ARTICLE, AND CERAMIC ARTICLE

TECHNICAL FIELD

The present invention relates to a method for molding a ceramic material, a method for producing a ceramic article, and a ceramic article. More specifically, the present invention relates to a method for molding a ceramic material, in which formation of burrs, etc. during molding is prevented, a method for producing a ceramic article, and a ceramic article.

BACKGROUND ART

Molding of ceramic parts uses a ceramic powder as the raw material and therefore, various molding methods such as injection molding, slip casting and extrusion molding can be employed to manufacture ceramic products having various shapes. In addition, various efforts have also been made so as to obtain ceramic parts having better properties. For example, there is known a method for producing a ceramic molded body, including heat-treating a ceramic molded body between demolding and drying of a ceramic molded body containing a solvent, in which little occurrence of cracking, etc., high shape retention, excellent dimensional accuracy, and excellent physical properties of a sintered body formed are achieved (see, for example, Patent Document 1).

On the other hand, a very high sphericity is required for a ceramic ball used for a rolling bearing (i.e., ball bearing). For producing such a ceramic ball, typically, a ceramic unfinished ball is manufactured through a molding process of press-hardening a ceramic raw material powder, a primary firing process of firing the hardened one at high temperature, and a secondary firing process of firing it at high temperature and high pressure, such as HIP (hot isostatic press) and gas pressure firing, furthermore, the obtained ceramic unfinished ball is polished and finished by mechanical polishing, etc. to have a high sphericity, and the ceramic ball is thereby produced.

In the molding process of the ceramic unfinished ball, first, a spherical molded body is formed by filling a cavity of a metal mold press, a rubber press, etc. with a ceramic raw material powder, and usually, a mold divided into two or more pieces is used as the metal mold or rubber mold. Consequently, a raw material powder inevitably enters a gap appearing in a portion where molds of the metal mold press or the rubber press are joined, and is press-hardened. As a result, an unnecessary portion, typically called a burr, protruding outward from the surface of the molded body (for example, a belt-shaped portion protruding outward throughout the circumferential direction) is inevitably formed.

CITATION LIST

Patent Literature

Patent Document 1: JP-A-2007-136912

SUMMARY OF INVENTION

Technical Problem

In the case where a ceramic unfinished ball having such a belt-shaped unnecessary portion is polished and finished into a ceramic ball for bearings having a very high sphericity, the amount of burrs is large, and the machining of burrs requires a lot of labor and a high cost.

Furthermore, during polishing, for example, a corner of the belt-shaped portion may hit on a grindstone and chipped to generate a defect in the ceramic ball itself. In this case, a scratch, etc. are left on the polished ball, and this cannot be used as a product, which causes a problem such as reduction in the production yield of a product.

In consideration of the aforementioned points, an object of the present invention is to provide a method for molding a ceramic material, in the production of a ceramic article, to obtain a molded body with few burrs protruding outward, a ceramic article obtained by sintering the molded body with few burrs, and a method for producing the ceramic article.

Solution to Problem

As a result of intensive studies to solve the aforementioned problem, the present inventors have found that when a slurry ceramic material is injected into an elastic container and the container is filled therewith, followed by curing it to form a molded body, the molded body with good shape retention and few burrs is obtained.

That is, the method for molding a ceramic material of the present invention is characterized by mixing a ceramic powder, a resin, a curing agent and a solvent to obtain a raw material slurry as a ceramic material, injecting the raw material slurry into an elastic container, curing the resin in the raw material slurry injected into the elastic container to form a molded body having a desired shape, and demolding the molded body from the elastic container.

In addition, the method for producing a ceramic article of the present invention is characterized by drying the molded body obtained by the aforementioned method for molding a ceramic material, degreasing the dried molded body, and firing the degreased molded body.

Advantageous Effects of Invention

According to the method for molding a ceramic material of the present invention, a molded body with good shape retention and few burrs is obtained. In addition, according to the ceramic article of the present invention and the production method thereof, a ceramic article is produced by firing the molded body above and therefore, a sintered body with a desired shape and few burrs is obtained.

In the case of this sintered body with few burrs, the amount of processing such as polishing can be small, and the production cost can be reduced. Furthermore, generation of a defect during processing can be reduced, and the product yield can be enhanced.

DESCRIPTION OF EMBODIMENTS

The method for molding a ceramic material and the method for producing a ceramic article, each being one embodiment of the present invention, are described in detail below.

[Method for Molding Ceramic Material]

Figure 1:
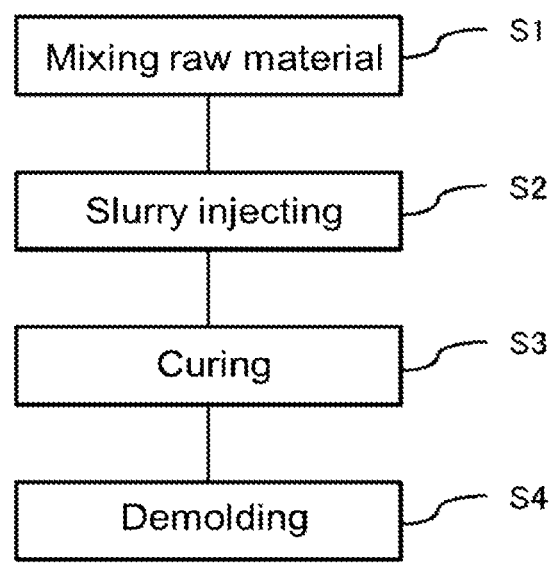
FIG. 1 is a flow chart of respective steps in an example of the method for molding a ceramic material of the present invention.

The method for molding a ceramic material that is one embodiment of the present invention includes a raw material mixing step, a defoaming step, a slurry injecting step, a curing step, and a demolding step (FIG. 1). Each of these steps is described.

(Raw Material Mixing Step)

The raw material mixing step is a step of mixing a ceramic powder having a desired composition, a resin, a curing agent, and a solvent to obtain a slurry ceramic material (hereinafter referred to as a raw material slurry) (S1).

The ceramic powder used here is not particularly limited as long as it becomes a ceramic by sintering, and examples thereof include a common ceramic powder. Examples of the ceramic powder include, for example, aluminum oxide, zirconium oxide, silicon oxide, silicon nitride, silicon carbide, aluminum nitride, and SiAlON. One of these may be used alone, or two or more thereof may be used as a mixture.

The 50% particle diameter $D_{50}$ of the ceramic powder is preferably less than 1.0 μm so that a stable sintered body can be obtained in the sintering step described later. When the 50% particle diameter $D_{50}$ is 1.0 μm or more, molding failure may occur due to particle sedimentation in the slurry, causing reduction in the sintering density. The 50% particle diameter $D_{50}$ is more preferably 0.8 μm or less, still more preferably 0.6 μm or less. In addition, the particle diameter $D_{50}$ is preferably 0.1 μm or more, because it becomes easy to prevent scattering or clogging on handling or prepare the ceramic powder.

In the case of using silicon nitride ($Si_3N_4$) as the ceramic powder, the structure obtained after sintering takes a form where main-phase crystal grains containing silicon nitride as a main component are bonded in a vitreous and/or crystalline bonding phase.

At this time, the ceramic powder containing $Si_3N_4$ is preferably a powder in which the ratio of α-phase of $Si_3N_4$ contained in the powder is 70% or more, more preferably 80% or more, still more preferably 90% or more. If the ratio of α-phase in the powder is less than 70%, an incorporation effect of an acicular structure on the phase transition from α to β during sintering is not sufficiently obtained, and the strength decreases. When a powder having the ratio of α-phase of 90% or more is used, a sufficient incorporation effect is achieved, and a sintered body having high strength, particularly high toughness, is obtained. The ceramic powder preferably contains such $Si_3N_4$ in an amount of 85 mass % or more, more preferably 92 mass % or more.

In addition, as the sintering aid, the ceramic powder preferably contains a sintering aid containing at least one element selected from the element group of Group 2 (alkaline earth metal), Group 3 (rare earth (scandium group)), Group 4 (titanium group), Group 5 (earth metal (vanadium group)), Group 13 (boron group (earth metal)) and Group 14 (carbon group) in an amount, in terms of oxides, of from 1 to 15 mass %, more preferably from 2 to 8 mass %. In order to obtain a uniform and high-strength sintered body, the content of the sintering aid is preferably smaller, but if the content is less than 1 mass %, it may be difficult to obtain a sintered body.

The resin is a component for molding the ceramic material into a desired shape in the curing step described later and examples thereof include a common curable resin. The resin used in this embodiment is required to provide good shape retention through a curing step, and a resin capable of forming a three-dimensional network structure by a polymerization reaction is used. At this time, from the viewpoint of achieving high fluidity of the mixture and good filling property for the elastic container described later, the resin is preferably in liquid form.

In addition, the resin is required to be easily removed from the ceramic molded body in the degreasing step before sintering after the curing step. Examples of such a resin include, for example, an epoxy resin, a phenol resin, a melamine resin, an acrylic acid resin, and a urethane resin. Among these, an epoxy resin is suitably used because of good shape retention. Examples of the epoxy resin include a glycidyl ether epoxy resin of bisphenols such as bisphenol A and bisphenol F, a phenol novolak epoxy resin, a cresol novolak epoxy resin, a glycidyl amine epoxy resin, a glycidyl ether epoxy resin such as aliphatic epoxy resin, a glycidyl ester epoxy resin, a methyl glycidyl ether epoxy resin, a cyclohexene oxide epoxy resin, and a rubber-modified epoxy resin.

The average molecular weight of the epoxy resin is preferably from 20 to 30,000 and for the reason that mixing with a powder is easy and constant mechanical strength is obtained, more preferably from 50 to 3,000, still more preferably from 50 to 2,500.

The curing agent cures the resin and is selected based on the resin used. Examples of the curing agent include an amine-based curing agent, an acid anhydride-based curing agent, a polyamide-based curing agent, etc. The amine-based curing agent is preferable in view of rapid reaction, and the acid anhydride-based curing agent is preferable because a cured product with excellent thermal shock resistance is obtained.

Examples of the amine-based curing agent include an aliphatic amine, an alicyclic amine, an aromatic amine, etc., and any of a monoamine, a diamine, a triamine and a polyamine may be used. Examples of the acid anhydride-based curing agent include methyltetrahydrophthalic anhydride, dibasic acid polyanhydride, etc.

The solvent adjusts the viscosity of a mixture of raw materials used, thereby making a slurry, and facilitates filling of an elastic container described later, with the raw material slurry. As the solvent used here, for example, water, alcohols and other organic solvents may be used. Among these, an aqueous solvent is preferable in view of production cost and environmental load.

At this time, a resin and a solvent are combined to provide good affinity therebetween so as to facilitate the removal of the resin in the degreasing step described later. If the affinity is poor, the resin and the solvent may be separated and segregation occurs inside the molded body, causing generation of a defect such as pore during sintering.

A raw material slurry is obtained by mixing the aforementioned ceramic powder, resin, curing agent and solvent. At this time, mixing may be performed by a known method, and examples thereof include a dissolver, a homomixer, a kneader, a roll mill, a sand mill, a ball mill, a bead mill, a vibrator mill, a high-speed impeller mill, an ultrasonic homogenizer, a shaking apparatus, a planetary mill, a rotation-revolution mixer, and an in-line mixer.

In the case of a reactive-curing one, a reaction starts upon mixing the resin with the curing agent and therefore, a slurry containing the resin and a slurry containing the curing agent may be separately prepared and be mixed when they are used. In this case, the ceramic powder may be mixed in either slurry or may be mixed in both slurries, and furthermore, a slurry containing the ceramic powder may be separately prepared. Above all, it is preferable to mix the ceramic material in both slurries containing the resin and the curing agent, respectively, and adjust the concentrations to the same level, since the concentration variation, etc. is small when the slurries are mixed and a stable operation can be performed.

First, a raw material slurry containing a ceramic raw material mixture and water is prepared.

The viscosity of the raw material slurry obtained here may be any viscosity as long as filling in the slurry injecting step described later is facilitated. For example, the viscosity at a shear rate of 10 [1/s] is preferably 50 Pa·s or less, more preferably 20 Pa·s or less. Considering handleability after filling, the viscosity is still more preferably from 0.1 to 10 Pa·s. The viscosity can be easily adjusted by the usage amount of the solvent used or the addition amount of the resin in the raw materials.

Gas is sometimes contained in the obtained raw material slurry due to the entrainment of air, etc. during mixing in the raw material mixing step. Accordingly, it is preferable that a defoaming step of removing a gas contained in the raw material slurry is performed before a slurry injecting step that is the next step. If a gas is contained in the raw material slurry, pores attributable to air bubbles may be generated inside in the curing step and remain in a ceramic article obtained by firing.

In the defoaming step, the raw material slurry may be defoamed under reduced pressure, and a defoaming pump (vacuum pump), a defoaming mixer, etc. may be used. In defoaming, the slurry may be processed, for example, for 1 to 5 minutes under reduced pressure of 0.6 to 10 kPa. In the case of using a defoaming mixer, it is also possible to perform the raw material mixing step and the defoaming step at the same time. Examples of the defoaming mixer used here include, for example, a vacuum pump-mounted rotation-revolution mixer and a planetary mixer.

(Slurry Injecting Step)

The slurry injecting step is a step of injecting a raw material slurry obtained through the raw material mixing step and the defoaming step, into a molding container (S2). The present invention is characterized by using an elastic container as the molding container.

The elastic container used here is a container composed of an elastic material and capable of deforming in the extending direction upon injecting of the raw material slurry. Examples of the elastic material forming the elastic container include a known material having elasticity and include, for example, an elastic material such as natural rubber, e.g. latex, and synthetic rubber, e.g. nitrile rubber and polyurethane.

The elastic container may be a container having an arbitrary shape and examples thereof include a balloon-shaped one capable of maintaining the raw material slurry injected in a spherical shape, and a container capable of maintaining the slurry in an oval or heart shape, etc. In addition, the slurry may also be molded into a desired shape by changing the elasticity of the elastic container depending on the position or combining a hard member and an elastic member.

Figure 2:
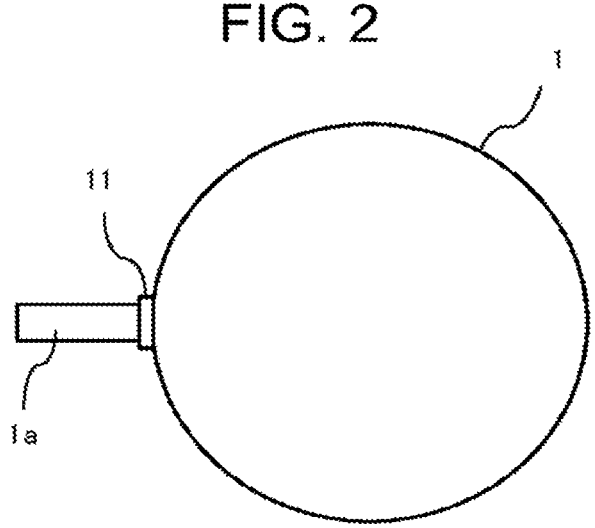
FIG. 2 is a diagram illustrating an example of the state of an elastic container filled with a raw material slurry.

In such an elastic container, the number of raw material slurry inlet ports is preferably one. This is because, when the injecting of the raw material slurry is completed, the container can be easily sealed only by plugging the one inlet port. During sealing of the container, since the material is elastic, the container can be easily sealed by means of a binding band, a binding clip, etc. FIG. 2 illustrates an example of the state where an elastic container 1 capable of providing a spherical molded body is filled with the raw material slurry and sealed by plugging an inlet port 1a by means of a binding band 11.

Here, although an example having one inlet port for the raw material slurry is illustrated, a plurality of inlet ports may be provided. In the case where the number of inlet ports is one, the shape of the elastic container is easily changed and since the number of unnecessary portions such as protrusion formed near the inlet port of a molded body or a sintered body is one, the labor required for polishing is advantageously saved. In the case where a plurality of inlet ports are provided, the raw material slurry can be injected in a short time, and this is advantageous in terms of uniform injecting of the slurry or enhancement of the productivity. On the other hand, an unnecessary portion is formed at a plurality of places near inlet ports in a molded body or a sintered body, and the load of the polishing may increase, or a confluence line (so-called weld line) of slurry flows injected through different inlet ports may be formed.

Injecting of the slurry into such an elastic container may be achieved by use of an apparatus in which the raw material slurry can be delivered and supplied into the elastic container. Typically, examples of the apparatus include, for example, a pump such as a diaphragm pump, a tube pump and a syringe pump. In particular, a rotary positive displacement diaphragm pump equipped with a precision constant velocity cam having a structure not generating pulsation is preferable. In addition, an in-line mixer, which is capable of delivering a raw material slurry while preparing the slurry by mixing raw materials, may also be used. In the case of using an in-line mixer, it is possible to perform the raw material mixing step and the slurry injecting step at the same time. Furthermore, in the case of preparing, as the raw material slurry, a slurry containing the resin and a slurry containing the curing agent as described above and molding the slurry, the in-line mixer is advantageous in that both slurries mixed can be immediately delivered to the elastic container to fill.

(Curing Step)

The curing step is a step of, after injecting the raw material slurry into the elastic container, curing the resin component in the raw material slurry and curing the ceramic material in a desired shape (S3). In this curing step, the ceramic material is cured under predetermined curing conditions depending on the properties of the raw material slurry.

For example, in the case of a reactive-curing raw material slurry, a reaction starts upon mixing a slurry containing the resin component with a slurry containing the curing agent component and therefore, it is sufficient that the slurry is left to stand for a predetermined time. In this instance, the curing time is approximately from 1 hour to 3 days and in view of production efficiency, is preferably from 1 to 24 hours, more preferably from 1 to 12 hours.

In the case of a heat-curing raw material slurry, it is sufficient that the slurry is heated at a predetermined temperature and a sufficient curing time is ensured. For example, the slurry may be heated and cured at 80 to 150° C. for 5 to 120 minutes. In consideration of production conditions, production efficiency etc., curing is preferably performed at 80 to 100° C. for 5 to 90 minutes, more preferably at 80 to 100° C. for 5 to 60 minutes.

In this curing step, the elastic container filled with the raw material slurry is caused to undertake curing in an environment where the raw material slurry takes a desired form with the aid of, for example, the shape of the elastic container itself or an auxiliary member helpful in maintaining the shape. A placing table, etc. for curing may be prepared to place the slurry thereon as long as the effect on the molding shape of the elastic container is small, but since the slurry is housed in the elastic container and readily deforms, the curing is preferably performed while hanging the container in the air so as to eliminate external force as much as possible. In this case, points subjected to a load are dispersed, and deformation of the molded body can be reduced.

In the case of hanging the container, when the load is applied to one point, the deformation force is likely to be concentrated and therefore, an auxiliary member for holding in midair, which can disperse the load, may be used separately from the elastic container. In this case, the auxiliary member may hold the elastic container by an elastic portion while being externally fixed at a plurality of points by a material having higher elasticity than the elastic container and examples thereof include a member such as hammock. This auxiliary member does not house the slurry and therefore, may be a net.

Furthermore, in the curing step, the curing may be performed in the state of hanging the elastic container filled with the raw material slurry in a liquid. By hanging in a liquid, pressure due to the liquid is applied to the elastic container, in addition to the atmospheric pressure, and the force to cause downward deformation due to gravity can be alleviated.

In addition, in the case of hanging in a liquid, the ratio of the specific gravity of the liquid used to the specific gravity of the raw material slurry with which the elastic container is filled ([specific gravity of liquid]/[specific gravity of raw material slurry]) is preferably adjusted to be 0.2 or more, more preferably from 0.5 to 1.5. By thus adjusting the ratio between specific gravities of both, the deforming pressure applied to the raw material slurry can be more reduced.

Examples of the liquid that may be used here include water, an aqueous sodium polytungstate solution, a colloidal barium sulfate solution, etc. It is preferable that a substance having a large specific gravity, such as sodium polytungstate, is used as the solute since the specific gravity of the solution itself is increased, and thus the specific gravity can also be easily adjusted by changing the concentration. For example, in the case of using $Si_3N_4$ as the ceramic powder, since the specific gravity of the raw material slurry is approximately from 1.8 to 2.2 g/cm$^3$ and the specific gravity of an aqueous 60% sodium polytungstate solution is 1.9 g/cm$^3$, the ratio between specific gravities is from 0.9 to 1.1, and it is preferable that curing in a liquid is performed employing this combination.

In the curing step, if a desired shape can hardly be formed by using only the elastic container, not only in the method utilizing hanging, a placing table or in-liquid curing but also in any curing method, the aforementioned auxiliary member or a molding mold having a desired shape may be used. More specifically, a molded body may be prepared through curing in combination with a conventionally employed metal mold or a mold made of styrene foam, rubber, etc. In this case, even when the same molding mold as conventional one is used, since the raw material slurry is housed in the elastic container, a molded body can be formed in a desired shape without formation of a protrusion continuing in the circumferential direction.

(Demolding Step)

The demolding step is a step of taking out a molded body of the ceramic material cured in the curing step from the elastic container (S4). In the demolding step, the elastic material can be partially broken and ruptured. In the first place, the elastic container is expanded due to filling of the elastic container with the raw material slurry in the slurry injecting step. Accordingly, the elastic container, when partially broken, is entirely ruptured at once and shrunk, so that the molded body can very easily be demolded.

Specifically, the elastic container can be partially broken by pulling the periphery of the inlet port to apply a tensile stress and expand a cavity within the elastic container, and inserting a cutter, etc. into the cavity.

In addition, it is also possible to take out the molded body by opening the inlet port without breaking the elastic container. For example, the molded body may be taken out by introducing a gas such as air into the elastic container to expand the elastic container and form a cavity. In this case, the elastic container can be repeatedly used, and the production cost can be reduced.

The molded body of the ceramic material taken out from the elastic material in this way has a desired shape according to the extension state of the elastic material and is obtained as a molded body where the surface has less burrs, etc. protruding from the surface of the molded body having a desired shape and is smooth.

[Method for Producing Ceramic Article]

Next, the method for producing a ceramic article, which is one embodiment of the present invention, is described. The method for producing a ceramic article includes a drying step of drying a molded body obtained by the aforementioned method for molding a ceramic material, a degreasing step of degreasing the dried molded body, and a sintering step of sintering the degreased molded body.

Figure 3:
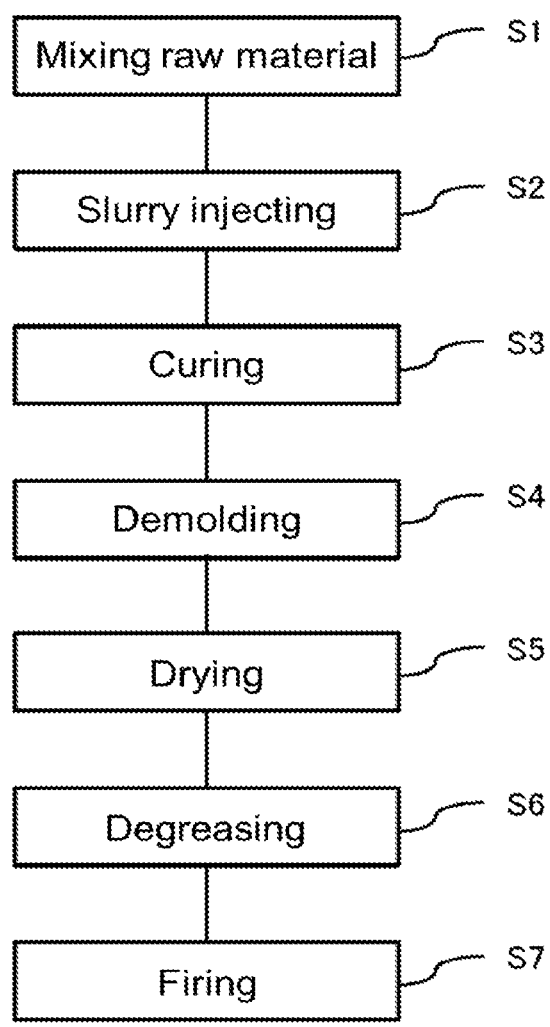
FIG. 3 is a flow chart of respective steps illustrating an example of the method for producing a ceramic article of the present invention.

More specifically, the method for producing a ceramic article includes a raw material mixing step, a slurry injecting step, a curing step, a demolding step, a drying step, a degreasing step, and a firing step (FIG. 3). However, the process from the raw material mixing step to the demolding step (S1 to S4) is the same as in the method for molding a ceramic material, and the description thereof is omitted.

(Drying Step)

The drying step is a step of removing water, a volatile solvent, etc. from the molded body obtained in the demolding step, and thereby drying the molded body (S5). In this drying step, the drying is gently performed so as not to generate cracks, etc. in the molded body. More specifically, the molded body is dried while preventing generation of cracks, etc. due to shrinkage stress attributable to a difference in the drying rate between the surface and the interior.

Examples of the conditions in the drying step include, for example, conditions where water, etc. contained in the molded body are removed over a long period of time under relatively mild conditions such as 25 to 30° C., a relative humidity of 60 to 95%, and from 48 hours to 7 days. Here, the drying step is preferably performed until the water content of the molded body is reduced to 20% or less relative to the bone dry mass.

(Degreasing Step)

The degreasing step is a step of removing a resin, a nonvolatile solvent, etc. from the molded body obtained in the drying step (S6). In this step, it is preferable to almost completely remove a component inhibiting sintering in a sintering step, which is the next step. If such a component remains in a large amount, pores may be generated within a sintered body during sintering or a carbide is produced as a byproduct and, for example, properties required for a final product may not be obtained.

Examples of the conditions in the degreasing step include, for example, a condition where a resin component, etc. contained in the molded body are removed over a relatively long time of 5 to 14 days at 400 to 800° C. Here, the degreasing step particularly in the case of silicon nitride is preferably performed until the residual carbon amount in the molded body is reduced to 200 ppm or less. This does not apply to a carbide such as SiC.
(Firing Step)

The firing step is a step of firing the molded body after the degreasing step to sinter the ceramic material and thereby obtain a ceramic article (S7). Firing in the firing step is performed to obtain a ceramic by sintering a mixed powder, and the ceramic may be produced by a common firing method.

The firing conditions in the firing step are not particularly limited as long as a ceramic body is obtained by firing but, for example, in the case of firing silicon nitride, an atmosphere having an oxygen concentration of 50 ppm or less in a nitrogen atmosphere is preferable. In this step, the maximum temperature of the firing temperature is equal to or less than 1,800° C., at which silicon nitride starts undergoing thermal decomposition. The maximum temperature is preferably from 1,650 to 1,750° C. The firing time is preferably from 240 minutes to 12 hours.
(Secondary Firing Step)

The fired body obtained in the firing step may be further subjected to a secondary firing step so as to provide a sintered body having desired properties. The secondary firing step is a step of further subjecting the fired body obtained in the firing step (primary firing) to a high-pressure treatment to densify the structure of the fired body.

As the high-pressure treatment in the secondary firing step, hot isostatic press (HIP), gas pressure firing, hot press, etc. can be used. Typically, the strength of a sintered body obtained by sintering is high, and the treatment is preferably performed by HIP in the ranges from 1,500 to 1,700° C. and from 50 to 200 MPa.

EXAMPLES

The present invention is described in greater detail below based on Examples and Comparative Examples, but the present invention should not be construed as limited to these Examples.

Example 1

(Preparation of Slurry ab)

A silicon nitride slurry (slurry ab) serving as a base of the raw material slurry was prepared by mixing 73.01 parts by mass of silicon nitride powder (produced by Denka Company Limited., trade name: SN-9FWS), 2.09 parts by mass of spinel powder as a sintering aid, 23.16 parts by mass of water as a solvent, and 1.61 parts by mass of quaternary ammonium salt (produced by SACHEM, Inc.) as a dispersant, by means of a ball mill.

In the ball mill above, a silicon nitride ball (produced by Nikkato Corp., diameter: 5 mm) was used as the pulverization medium.
(Preparation and Defoaming of Slurry a1)

An epoxy resin-containing silicon nitride slurry (slurry a1) was prepared by mixing 90.10 parts by mass of slurry ab and 9.9 parts by mass of water-soluble epoxy resin (produced by Nagase ChemteX Corporation), by means of a vacuum pump-mounted rotation-revolution mixer.

The slurry a1 was rendered free of air bubbles of 10 μm or more by pressure reduction (0.6 KPa).
(Preparation and Defoaming of Slurry a2)

A resin curing agent-containing silicon nitride slurry (slurry a2) was prepared by mixing 98.4 parts by mass of slurry ab and 1.6 parts by mass of a resin curing agent (obtained by mixing triethylenetetramine and 2,4,6-tris(dimethylaminomethyl)phenol at a mass ratio of 2:1), by means of a vacuum pump-mounted rotation-revolution mixer.

The slurry a2 was rendered free of air bubbles of 10 μm or more by pressure reduction (0.6 KPa).
(Slurry Injecting)

A slurry tank 1 and a slurry tank 2 were respectively filled with the slurry a1 and the slurry a2 to give the same volume and thereafter, the slurry a1 and the slurry a2 were respectively suctioned and discharged from the slurry tank 1 and the slurry tank 2 by using two units of a rotary positive displacement diaphragm pump manufactured by TACMINA Corp. which does not generate pulsation and causes no entrainment of air and on which a precision constant velocity cam is mounted, and delivered to an in-line mixer manufactured by NORITAKE Co., Ltd. (trade name: Static Mixer) via piping joining the slurry a1 to the slurry a2.

In the in-line mixer, the slurries were mixed to make a raw material slurry A containing an epoxy resin and a resin curing agent and at the same time, the raw material slurry A was supplied to an elastic rubber container 1 (manufactured by Fuji Latex Co., Ltd.) connected to the outlet side of the in-line mixer.

Under inverter control of the diaphragm pump, 150 mL of raw material slurry A was supplied to the elastic rubber container 1 at a supply pressure of 0.13 MPa to fill the container and as illustrated in FIG. 2, the elastic rubber container 1 spherically expanded and thereafter, was bound by an elastic rubber container-binding jig (manufactured by Fuji Latex Co., Ltd.). The elastic rubber container 1 is a rubber container that has one inlet port and is spherically expandable and contractable.
(Curing)

The elastic rubber container 1 filled with the raw material slurry A was hung overnight in water (specific gravity: 1.0) at a water temperature of 25° C., and the epoxy resin and the resin curing agent were thereby reacted and cured in the elastic rubber container 1. At this time, the silicon nitride slurry injected was cured to have a spherical shape without deforming.
(Demolding)

The inlet port of the elastic rubber container 1 was pulled to apply a tensile stress to the elastic rubber container 1 and expand a cavity in the elastic container 1 and after inserting a cutter into the cavity and rupturing the elastic rubber container 1, a silicon nitride molded body 1 cured to have a spherical shape was taken out. The obtained silicon nitride molded body 1 had a diameter of 66 mm and was free of belt-shaped burrs protruding outward throughout the circumferential direction, and the surface thereof was very smooth.

(Drying) In order to prevent generation of cracks due to rapid drying (i.e., cracks due to shrinkage stress attributable to a difference in the drying rate between the ball surface and the ball interior), the silicon nitride molded body 1 cured to have a ball was left on a foaming urethane resin to stand and dried for 1 week in a thermohygrostat bath controlled to a temperature of 25° C. and a relative humidity of 90%.
(Degreasing)

The dried silicon nitride molded body 1 was heated to 700° C. from room temperature over 1 week in an air atmosphere and held at 700° C. for 1 day to burn out the curable resin component contained in the silicon nitride molded body 1, thereby performing degreasing.
(Firing)

The degreased silicon nitride molded body 1 was fired at 1,700° C. for a holding time of 12 hours in a nitrogen atmosphere. After the firing, a spherical silicon nitride sintered body 1 was obtained.
(HIP)

Furthermore, the silicon nitride sintered body 1 was subjected to HIP (hot isostatic press) at 1,700° C. under a pressure of 100 MPa by using a nitrogen gas as the pressure medium. After HIP, a spherical silicon nitride sintered body 1 that was dense with a density of 3.2 g/cm$^3$, had a smooth surface, and had a diameter of 50 mm was obtained.
(Evaluation)

A test piece was fabricated from the silicon nitride sintered body 1, and measurements of three-point bending strength, Vickers hardness and fracture toughness by IF method and SEM (scanning electron microscope) observation of a cross section were performed. As a result, it was confirmed that the standard "Class 1" of silicon nitride for rolling bearing of "JIS R 1669" is satisfied.

Example 2

(Preparation of Slurry bb)

A silicon nitride slurry (slurry bb) serving as a base of the raw material slurry was prepared by mixing 73.04 parts by mass of silicon nitride powder (produced by Denka Co., Ltd., trade name: SN-9FWS), 2.19 parts by mass of spinel powder and 0.04 parts by mass of cerium oxide powder (produced by Shin-Etsu Chemical Co., Ltd.), as sintering aids, 23.15 parts by mass of water as a solvent, and 1.61 parts by mass of quaternary ammonium salt (produced by SACHEM, Inc.) as a dispersant, by means of a ball mill.

In the ball mill above, a silicon nitride ball (produced by Nikkato Corp., diameter: 5 mm) was used as the pulverization medium.

Subsequently, an epoxy resin-containing silicon nitride slurry (slurry b1) and a resin curing agent-containing silicon nitride slurry (slurry b2) were prepared and defoamed by the same operation as in Example 1 except that slurry bb was used in place of slurry ab. Furthermore, a silicon nitride molded body 2 cured to have a ball was prepared through slurry injecting, curing and demolding by the same operation as in Example 1 except that slurries b1 and b2 were used in place of slurries a1 and a2 and a raw material slurry B obtained by mixing slurries b1 and b2 was used. The obtained silicon nitride molded body 2 had a diameter of 66 mm and was free of belt-shaped burrs protruding outward throughout the circumferential direction, and the surface thereof was very smooth.

Subsequently, through the same drying, degreasing, firing and HIP as those in Example 1, a spherical silicon nitride sintered body 2 that was dense with a density of 3.2 g/cm$^3$, had a smooth surface, and had a diameter of 50 mm was obtained.

The same evaluation as in Example 1 was performed. As a result, it was confirmed that the standard "Class 1" of silicon nitride for rolling bearing of "JIS R 1669" is satisfied.

Example 3

A silicon nitride sintered body 3 cured to have a spherical shape was prepared by the same processing as in Example 1 except that, in the curing operation, curing was performed while hanging overnight the elastic rubber container 1 filled with the raw material slurry A in an aqueous 60% sodium polytungstate (specific gravity: 1.9) in place of water. The obtained silicon nitride sintered body 3 had a diameter of 66 mm and was free of belt-shaped burrs protruding outward throughout the circumferential direction, and the surface thereof was very smooth.

Subsequently, through the same drying, degreasing, firing and HIP as those in Example 1, a spherical silicon nitride sintered body 3 that was dense with a density of 3.2 g/cm$^3$, had a smooth surface, and had a diameter of 50 mm was obtained.

The same evaluation as in Example 1 was performed, and as a result, it was confirmed that the standard "Class 1" of silicon nitride for rolling bearings of "JIS R 1669" is satisfied.

Example 4

(Preparation of Slurry cb)

A silicon carbide slurry (slurry cb) serving as a base of the raw material slurry was prepared by mixing 69.56 parts by mass of silicon carbide powder (produced by YAKUSHIMA DENKO Co., Ltd., trade name: OY-15), 5.29 parts by mass of aluminum oxide and 0.68 parts by mass of yttrium oxide, as sintering aids, 23.04 parts by mass of water as a solvent, and 1.40 parts by mass of quaternary ammonium salt (produced by SACHEM, Inc.) as a dispersant, by means of a ball mill.

In the ball mill above, an alumina ball (produced by Nikkato Corp., diameter: 5 mm) was used as the pulverization medium.
(Preparation and Defoaming of Slurry c1)

A water-soluble epoxy resin-containing silicon carbide slurry (slurry c1) was prepared by mixing 90.41 parts by mass of slurry cb and 9.59 parts by mass of water-soluble epoxy resin (produced by Nagase ChemteX Corporation), by means of a vacuum pump-mounted rotation-revolution mixer.

The slurry c1 was rendered free of air bubbles of 10 μm or more by pressure reduction (0.6 kPa).
(Preparation and Defoaming of Slurry c2)

A resin curing agent-containing silicon carbide slurry (slurry c2) was prepared by mixing 98.53 parts by mass of slurry cb and 1.47 parts by mass of a resin curing agent (obtained by mixing triethylenetetramine and 2,4,6-tris(dimethylaminomethyl)phenol at a mass ratio of 2:1), by means of a vacuum pump-mounted rotation-revolution mixer.

The slurry c2 was rendered free of air bubbles of 10 μm or more by pressure reduction (0.6 kPa).

Subsequently, a silicon carbide molded body 4 cured to have a spherical shape was prepared through slurry injecting, curing and demolding by the same operation as in Example 1 except that slurries c1 and c2 were used in place of the slurries a1 and a2 and a raw material slurry C obtained by mixing the slurries c1 and c2 was used. The obtained silicon carbide molded body 4 had a diameter of 66 mm and was free of belt-shaped burrs protruding outward throughout the circumferential direction, and the surface thereof was very smooth.

Subsequently, after the same drying and degreasing as those in Example 1, the degreased silicon carbide molded body 4 was fired at 1,970° C. for a holding time of 12 hours in an argon atmosphere. After the firing, a spherical silicon carbide sintered body 4 was obtained.
(HIP)

Furthermore, the silicon carbide sintered body 4 was subjected to HIP (hot isostatic press) at 1,900° C. under a pressure of 100 MPa by using an argon gas as the pressure medium. After HIP, a spherical silicon carbide sintered body 4 that was dense with a density of 3.2 g/cm$^3$, had a smooth surface, and had a diameter of 50 mm was obtained.
(Evaluation)

A test piece was fabricated from the silicon carbide sintered body 4 and measured for the three-point bending strength, and as a result, the average strength of 20 test pieces was 720 MPa. Furthermore, SEM (scanning electron microscope) observation of a cross section was performed. As a result, pores of 10 μm or more were not observed.

Example 5

(Preparation of Slurry db)

An aluminum oxide slurry (slurry db) serving as a base of the raw material slurry was prepared by mixing 81.87 parts by mass of aluminum oxide (produced by Showa Denko K.K., trade name: 160SG), 17.41 parts by mass of water as a solvent, and 0.72 parts by mass of ammonium polycarboxylate salt (produced by CHUKYO YUSHI Co., Ltd.) as a dispersant, by means of a ball mill.

In the ball mill above, an alumina ball (produced by Nikkato Corp., diameter: 5 mm) was used as the pulverization medium.
(Preparation and Defoaming of Slurry d1)

A water-soluble epoxy resin-containing aluminum oxide slurry (slurry d1) was prepared by mixing 90.41 parts by mass of slurry db and 9.59 parts by mass of water-soluble epoxy resin (produced by Nagase ChemteX Corporation), by means of a vacuum pump-mounted rotation-revolution mixer.

The slurry d1 was rendered free of air bubbles of 10 μm or more by pressure reduction (0.6 kPa).
(Preparation and Defoaming of Slurry d2)

A resin curing agent-containing aluminum oxide slurry (slurry d2) was prepared by mixing 98.41 parts by mass of slurry db and 1.59 parts by mass of a resin curing agent (obtained by mixing triethylenetetramine and 2,4,6-tris(dimethylaminomethyl)phenol at a mass ratio of 2:1), by means of a vacuum pump-mounted rotation-revolution mixer.

The slurry d2 was rendered free of air bubbles of 10 μm or more by pressure reduction (0.6 kPa).

Subsequently, an aluminum oxide molded body 5 cured to have a spherical shape was prepared through slurry injecting, curing and demolding by the same operation as in Example 1 except that slurries d1 and d2 were used in place of the slurries a1 and a2 and a raw material slurry D obtained by mixing the slurries d1 and d2 was used. The obtained aluminum oxide molded body 5 had a diameter of 66 mm and was free of belt-shaped burrs protruding outward throughout the circumferential direction, and the surface thereof was very smooth.

Subsequently, after the same drying and degreasing as those in Example 1, the degreased aluminum oxide molded body 5 was fired at 1,400° C. for a holding time of 12 hours in an air atmosphere. After the firing, an aluminum oxide sintered body 5 that was dense with a density of 4.0 g/cm$^3$, had a smooth surface, and had a diameter of 50 mm was obtained.
(Evaluation)

A test piece was fabricated from the aluminum oxide sintered body 5 and measured for the three-point bending strength. As a result, the average strength of 20 test pieces was 500 MPa. Furthermore, SEM (scanning electron microscope) observation of a cross section was performed. As a result, pores of 10 μm or more were not observed.

Example 6

(Preparation of Slurry eb)

A zirconium oxide slurry (slurry eb) serving as a base of the raw material slurry was prepared by mixing 87.17 parts by mass of zirconium oxide (produced by Tosoh Corporation, trade name: TZ-3YE), 12.07 parts by mass of water as a solvent, and 0.76 parts by mass of ammonium polycarboxylate salt (produced by CHUKYO YUSHI Co., Ltd.) as a dispersant, by means of a ball mill.

In the ball mill above, a zirconia ball (produced by Nikkato Corp., diameter: 5 mm) was used as the pulverization medium.
(Preparation and Defoaming of Slurry e1)

An epoxy resin-containing zirconium oxide slurry (slurry e1) was prepared by mixing 90.41 parts by mass of slurry eb and 9.59 parts by mass of water-soluble epoxy resin (produced by Nagase ChemteX Corporation), by means of a vacuum pump-mounted rotation-revolution mixer).

The slurry e1 was rendered free of air bubbles of 10 μm or more by pressure reduction (0.6 kPa).
(Preparation and Defoaming of Slurry e2)

A resin curing agent-containing zirconium oxide slurry (slurry e2) was prepared by mixing 98.41 parts by mass of slurry eb and 1.59 parts by mass of a resin curing agent (obtained by mixing triethylenetetramine and 2,4,6-tris(dimethylaminomethyl)phenol at a mass ratio of 2:1), by means of a vacuum pump-mounted rotation-revolution mixer.

The slurry e2 was rendered free of air bubbles of 10 μm or more by pressure reduction (0.6 kPa).

Subsequently, a zirconium oxide molded body 6 cured to have a spherical shape was prepared through slurry injecting, curing and demolding by the same operation as in Example 1 except that slurries e1 and e2 were used in place of the slurries a1 and a2 and a raw material slurry E obtained by mixing the slurries e1 and e2 was used. The obtained zirconium oxide molded body 6 had a diameter of 66 mm and was free of belt-shaped burrs protruding outward throughout the circumferential direction, and the surface thereof was very smooth.

Subsequently, after the same drying and degreasing as those in Example 1, the degreased zirconium oxide molded body 6 was fired at 1,500° C. for a holding time of 12 hours in an air atmosphere. After the firing, a zirconium oxide sintered body 6 that was dense with a density of 6.0 g/cm$^3$, had a smooth surface, and had a diameter of 50 mm was obtained.
(Evaluation)

A test piece was fabricated from the zirconium oxide sintered body 6 and measured for the three-point bending strength. As a result, the average strength of 20 test pieces was 1,000 MPa. Furthermore, SEM (scanning electron microscope) observation of a cross section was performed. As a result, pores of 10 μm or more were not observed.

Comparative Example 1

After preparation and defoaming of the slurry ab, slurry a1 and slurry a2 of Example 1, the elastic rubber container 1 in the slurry injecting of Example 1 was changed to a mold-making silicone-made container made of a mold-making silicone (produced by Shin-Etsu Silicone, trade name: KE-1310T, and a curing agent thereof (trade name: CX32-164)), having an inlet port and an outlet port and having a structure divided into two parts at the center between the inlet port and the outlet port. The mold-making silicone-made container is a container in which the molding surface was prepared by mold making using an ABS-made master model ball having a diameter of 66 mm.

Slurries were delivered to the in-line mixer by the same operation as in Example 1 and mixed to make a raw material slurry A containing an epoxy resin and a resin curing agent and at the same time, the raw material slurry A was supplied to the mold-making silicone-made container 1 connected to the outlet side of the in-line mixer.

Under inverter control of the diaphragm pump, 150 mL of the raw material slurry A was supplied to the mold-making silicone-made container C1 to fill the container and after confirming its exit from the outlet port, each of the inlet port and the outlet port was plugged with a ball valve previously fitted thereto.

(Curing)

The mold-making silicone-made container filled with the raw material slurry A was left to stand overnight on a desk, and the raw material slurry A was thereby cured.

(Demolding)

The mold-making silicone-made container having a structure divided into two parts at the center between the inlet port and the outlet port was split, and a silicon nitride molded body C1 cured to have a spherical shape in the mold-making silicone-made container was taken out.

On the silicon nitride molded body C1 cured to have a spherical shape, a thin belt-shaped protrusion was observed on the outer side in the circumferential direction along a place divided into two parts at the center between the inlet port and the outlet port. The thin belt-shaped protrusion was very fragile and easily collapsed when pinched by fingers but a belt-like mark was left on the molded body.

In addition, columnar protrusions attributable to the inlet port and the outlet port were formed on the spherical silicon nitride molded body C1. The columnar protrusions were scraped off by means of a sharp cutter but circular marks were left in those places.

(Drying)

In order to prevent generation of cracks due to rapid drying (i.e., cracks due to shrinkage stress attributable to a difference in the drying rate between the ball surface and the ball interior), the silicon nitride molded body C1 cured to have a spherical shape was left to stand on a foaming urethane resin and dried for 1 week by arranging the circular mark of the inlet port faced down and the circular mark of the outlet port faced up in a thermohygrostat bath controlled to a temperature of 25° C. and a relative humidity of 90%.

On the dried silicon nitride molded body C1, a thin belt-like mark was observed, and circular marks attributable to the inlet port and the outlet port were left.

Subsequently, after the same degreasing as in Example 1, the degreased silicon nitride molded body C1 was fired at 1,700° C. for a holding time of 12 hours in a nitrogen atmosphere to obtain a spherical silicon nitride sintered body C1.

On the spherical silicon nitride sintered body C1 after firing, a thin belt-like mark was left. In addition, circular marks attributable to the inlet port and the outlet port were left, and cracks were observed in those places.

Comparative Example 2

After preparation and defoaming of the slurry ab, slurry a1 and slurry a2 of Example 1, the elastic rubber container 1 in the slurry injecting of Example 1 was changed to a styrene foam-made container made of styrene foam, having an inlet port and an outlet port and having a structure divided into two parts at the center between the inlet port and the outlet port. The styrene foam-made container was prepared by cutting a spherical portion having a diameter of 66 mm.

Slurries were delivered to the in-line mixer by the same operation as in Example 1 and mixed to make a raw material slurry A containing an epoxy resin and a resin curing agent and at the same time, the raw material slurry A was supplied to the styrene foam-made container 1 connected to the outlet side of the in-line mixer.

Under inverter control of the diaphragm pump, 150 mL of the raw material slurry A was caused to fill the styrene foam-made container and after confirming its exit from the outlet port, each of the inlet port and the outlet port was plugged with a ball valve previously fitted thereto.

(Curing)

The styrene foam-made container filled with the raw material slurry A was left to stand overnight on a desk, and the raw material slurry A was thereby cured.

(Demolding)

The styrene foam-made container having a structure divided into two parts at the center between the inlet port and the outlet port was split, and a silicon nitride molded body C2 cured to have a spherical shape in the styrene foam-made container was taken out.

On the silicon nitride molded body C2 cured to have a spherical shape, a thin belt-shaped protrusion was observed on the outer side in the circumferential direction along a place divided into two parts at the center between the inlet port and the outlet port.

The thin belt-shaped protrusion was very fragile and easily collapsed when pinched by fingers and a belt-like mark was left on the molded body.

In addition, columnar protrusions attributable to the inlet port and the outlet port were formed on the spherical silicon nitride molded body C2. The columnar protrusions were scraped off by means of a sharp cutter but circular marks were left in those places.

Furthermore, an innumerable number of fine protrusions attributable to pores in the styrene foam surface were observed on the surface of the spherical silicon nitride molded body C2.

Subsequently, after the same drying as in Comparative Example 1, a thin belt-like mark was observed on the dried silicon nitride molded body C2 and in addition, circular marks attributable to the inlet port and the outlet port were left.

Furthermore, an innumerable number of fine protrusions attributable to pores in the styrene foam surface were observed on the surface of the spherical silicon nitride molded body C2.

Subsequently, after the same degreasing as in Example 1, the silicon nitride degreased body C2 was fired at 1,700° C. for a holding time of 12 hours in a nitrogen atmosphere to obtain a spherical silicon nitride sintered body C2.

On the spherical silicon nitride sintered body C2 after firing, a thin belt-like mark was left. In addition, circular marks attributable to the inlet port and the outlet port were left, and cracks were observed in those places (cracks were generated in a place left by the circular protrusion on the outlet port side formed during curing). The reason therefor is considered as follows: since the circular mark on the outlet port side was arranged faced up in the drying and water therefore moved downward due to the effect of gravity, this place was dried earlier than other places of the ball surface and a residual stress attributable to drying shrinkage remained in the portion to generate cracks on firing.

Furthermore, an innumerable number of fine protrusions attributable to pores in the styrene foam surface were observed on the surface of the silicon nitride sintered body C2.

Then, this experiment was decided to be failed, and the work was stopped.

Comparative Example 3

(Preparation of Granulated Powder for Rubber Press)

A slurry ab was prepared by the same operation as in Example 1.

Water was added to the slurry ab prepared, and the concentration was adjusted to have a ceramic powder solid content of 20 mass % so as to make a slurry f1.

The slurry f1 was dried by a small spray dryer employing a two-fluid nozzle system to prepare a granular silicon nitride granulated powder F having a particle size distribution of 10 to 50 μm.

(Rubber Press Molding)

A mold-making silicone-made container C3 formed as a ball with a diameter of 76.2 mm, having an inlet port and a structure divided into two parts at the center of the inlet port, which was prepared with a steel ball (SUJ2) having a diameter of 76.2 mm (3 inches) as the master model and made of a mold-making silicone (produced by Shin-Etsu Silicone, trade name: KE-1310T) using a curing agent thereof (trade name: CX32-1649), was filled with the granular silicon nitride granulated powder F.

The mold-making silicone-made container C3 formed as a ball with a diameter of 76.2 mm and filled with the granular silicon nitride granulated powder F was packaged in a vacuum pack, followed by subjecting to cold isostatic press (CIP) at 180 MPa by using water as the pressure medium.

After CIP, the mold-making silicone-made container C3 formed as a ball with a diameter of 76.2 mm was taken out from the vacuum pack and split to obtain a spherical rubber press molded body C3 with a diameter of 58 mm compression-molded by CIP.

The obtained rubber press molded body C3 had a rough surface (with fine irregularities formed by consolidation of fine powder), which is specific to dry molding. In addition, on the ball surface, a columnar protrusion attributable to the inlet port and a belt-shaped protrusion extending along the split face of the mold on the outer side in the circumferential direction were formed.

(Degreasing and Primary Firing)

The spherical rubber press molded body 1 was heated to 700° C. from room temperature over 24 hours in a vacuum atmosphere and held at 900° C. for 12 hours to burn out the dispersant component contained in the silicon nitride molded body C3, thereby performing degreasing.

Subsequently, after the molded body was held at 900° C. for 12 hours, a nitrogen gas was introduced and the temperature was raised to 1,700° C. over 8 hours, and then the molded body was fired at 1,700° C. for 12 hours. After the firing, a spherical silicon nitride sintered body C3 was obtained.

The silicon nitride sintered body C3 had a rough surface (with fine irregularities formed by consolidation of fine powder). In addition, a columnar protrusion attributable to the inlet port and a belt-shaped protrusion extending on the outer side in the circumferential direction were formed as the sintered body.

(HIP)

The silicon nitride sintered body C3 was subjected to HIP at 1,700° C. under a pressure of 100 MPa by using a nitrogen gas as the pressure medium. After HIP, a spherical silicon nitride sintered body C3 of 50 mm in diameter with a density of 3.2 g/cm$^3$, having a belt-shaped protrusion extending on the outer side in the circumferential direction and a columnar protrusion attributable to the inlet port, was obtained.

Comparative Example 4

A series of operations from the preparation of slurry ab to slurry injecting were performed in the same manner as in Example 1.

(Curing)

The spherically expanded elastic rubber container 1 filled with the raw material slurry A was left to stand overnight on a desk. Consequently, the silicon nitride slurry cured by the reaction of the resin with the resin curing agent within the spherically expanded rubber container was pressed against the desk by gravity and was deformed into a distorted sphere and cured.

(Demolding)

The inlet port of the elastic rubber container 1 was pulled to apply a tensile stress to the elastic rubber container 1 and expand a cavity within the elastic container 1, and the elastic rubber container 1 was ruptured by inserting a cutter into the cavity.

A silicon nitride molded body C4 cured to have a distorted sphere shape was taken out from the ruptured elastic rubber container 1. The silicon nitride molded body C4 was free of belt-shaped portion protruding outward throughout the circumferential direction, and the surface thereof was very smooth, but since a target ball was not obtained, the subsequent work was stopped.

With respect to Examples 1 to 6 and Comparative Examples 1 to 4, the moldability, burrs and surface profile of the molded body obtained were evaluated as described below, and the results are shown together in Table 1.

[Moldability]

The shape of the molded body obtained was evaluated according to the following criteria.

Good: A molded body with a desired shape was obtained.

Not good: The shape was not a desired shape, or cracks, etc. were generated.

[Burrs]

Good: The molded body obtained was free of burrs.

Not good: The molded body obtained had burrs.

[Surface Profile]

The surface of the molded body obtained was evaluated with an eye or by touch and judged to be "smooth" when light reflection was good and the surface was smooth to the touch, and to be "rough" when light reflection was not good or the surface was scratchy to the touch.

TABLE 1

|  | Raw Material Slurry | | Molding Mold | Curing Method | Results | | |
|---|---|---|---|---|---|---|---|
|  | Kind | Composition of Main Raw Material |  |  | Moldability | Burrs | Surface Profile |
| Example 1 | raw material slurry A | $Si_3N_4$ | elastic rubber container 1 | in water | good | good | smooth |
| Example 2 | raw material slurry B | $Si_3N_4$ | elastic rubber container 1 | in water | good | good | smooth |
| Example 3 | raw material slurry A | $Si_3N_4$ | elastic rubber container 1 | in aqueous sodium polytungstate solution | good | good | smooth |
| Example 4 | raw material slurry C | SiC | elastic rubber container 1 | in water | good | good | smooth |
| Example 5 | raw material slurry D | $Al_2O_3$ | elastic rubber container 1 | in water | good | good | smooth |
| Example 6 | raw material slurry E | $ZrO_2$ | elastic rubber container 1 | in water | good | good | smooth |
| Comparative Example 1 | raw material slurry A | $Si_3N_4$ | mold-making silicone-made mold | still standing on desk | not good (cracks) | not good | smooth |
| Comparative Example 2 | raw material slurry A | $Si_3N_4$ | styrene foam-made mold | still standing on desk | not good (cracks) | not good | rough |
| Comparative Example 3 | raw material slurry A | $Si_3N_4$ | mold-making silicone-made mold | — | good | not good | rough |
| Comparative Example 4 | raw material slurry A | $Si_3N_4$ | elastic rubber container 1 | still standing on desk | not good (distorted) | good | smooth |

From the above, according to the method for molding a ceramic material and the method for producing a ceramic article of the present invention, a molded body and a sintered body, where the surface is free of burrs such as belt-like part protruding outward and is a smooth surface, are easily obtained.

INDUSTRIAL APPLICABILITY

The method for molding a ceramic material and the method for producing a ceramic article of the present invention can efficiently produce a ceramic article with a desired shape and are also applicable to the production of a ceramic ball for bearings.

REFERENCES SIGNS LIST

1: Elastic container
1a: Inlet port
11: Binding band

The invention claimed is:

1. A method for molding a ceramic material, comprising:
injecting a raw material slurry into a mold, the raw material slurry being obtained by mixing a ceramic powder, a resin, a reactive-curing curing agent and a solvent;
curing the resin in the raw material slurry injected into the mold to form a molded body having a desired shape; and
demolding the molded body from the mold,
wherein the raw material slurry is obtained by preparing a slurry comprising the resin and a slurry comprising the curing agent separately, and mixing the slurry comprising the resin and the slurry comprising the curing agent before injecting the slurries into the mold.

2. The method for molding a ceramic material according to claim 1, wherein the ceramic powder is contained in either or both of the slurry comprising the resin and the slurry comprising the curing agent.

3. The method for molding a ceramic material according to claim 2, wherein the ceramic powder is contained in both of the slurry comprising the resin and the slurry comprising the curing agent such that concentrations of the ceramic powder in the slurries are approximately same.

4. The method for molding a ceramic material according to claim 2, comprising:
filling a first slurry tank with the slurry comprising the resin and filling a second resin tank with the slurry comprising the curing agent;
delivering the slurry comprising the resin and the slurry comprising the curing agent to a mixer from the first slurry tank and the second slurry tank respectively; and
mixing the slurry comprising the resin and the slurry comprising the curing agent in the mixer, thereby obtaining the raw material slurry.

5. The method for molding a ceramic material according to claim 1, wherein the mold is an elastic container.

6. The method for molding a ceramic material according to claim 5, wherein the curing of the resin is performed while hanging the elastic container under a pressure equal to or higher than atmospheric pressure.

7. The method for molding a ceramic material according to claim 6, wherein the curing of the resin in the raw material slurry is performed in a liquid.

8. The method for molding a ceramic material according to claim 7, wherein a ratio of a specific gravity of the liquid to a specific gravity of the raw material slurry ([specific gravity of liquid]/[specific gravity of raw material slurry]) is 0.2 or more.

9. The method for molding a ceramic material according to claim 1, wherein the desired shape is a sphere.

10. The method for molding a ceramic material according to claim 1, using silicon nitride as the ceramic powder.

11. The method for molding a ceramic material according to claim 1, wherein the ceramic powder contains $Si_3N_4$ having a ratio of α-phase of 70% or more in an amount, as represented by mass % based on oxides, of 85 mass % or more and a sintering aid containing at least one element selected from the element group consisting of Group 2, Group 3, Group 4, Group 5, Group 13 and Group 14 in an amount, in terms of oxides, of from 1 to 15 mass %.

12. A method for producing a ceramic article, comprising:
drying a molded body;
degreasing the dried molded body; and
firing the degreased molded body,
wherein the molded body is prepared by a method comprising
injecting a raw material slurry into a mold, the raw material slurry being obtained by mixing a ceramic powder, a resin, a reactive-curing curing agent and a solvent;
curing the resin in the raw material slurry injected into the mold to form a molded body having a desired shape; and
demolding the molded bud from the mold,
wherein the raw material slurry is obtained by preparing a slurry comprising the resin and a slurry comprising the curing agent separately, and mixing the slurry comprising the resin and the slurry comprising the curing agent before injecting the slurries into the mold.

13. The method for producing a ceramic article according to claim 12, comprising secondary firing by hot isostatic press (HIP) to densify a sintered body obtained by the firing.

14. The method for producing a ceramic article according to claim 12, wherein the ceramic article is a ceramic ball for bearings.

* * * * *